United States Patent [19]

Lambelet, Jr. et al.

[11] Patent Number: 4,941,598
[45] Date of Patent: Jul. 17, 1990

[54] DOSING CAP

[75] Inventors: Lawrence E. Lambelet, Jr., Flemington, N.J.; Thomas A. Frazier, Williamsport, Pa.

[73] Assignee: Ortho Pharmaceutical Corporation, Raritan, N.J.

[21] Appl. No.: 268,416

[22] Filed: Nov. 8, 1988

[51] Int. Cl.⁵ ............................................. B65D 35/28
[52] U.S. Cl. ..................................... 222/321; 222/95; 222/490
[58] Field of Search .................. 222/42, 94, 95-96, 222/107, 205, 207, 209, 212-213, 344, 361, 386, 490, 492-493, 495, 320-321

[56] References Cited

U.S. PATENT DOCUMENTS

| | | | |
|---|---|---|---|
| 2,904,227 | 9/1959 | Graham | 222/207 |
| 2,942,762 | 6/1960 | Fahr | 222/207 |
| 3,165,242 | 1/1965 | Jackson | 222/495 |
| 3,338,475 | 8/1967 | Englesson | 222/207 X |
| 3,828,985 | 8/1974 | Schindler | 222/207 |
| 4,376,495 | 3/1983 | Spatz | 222/46 |
| 4,437,582 | 3/1984 | Dorner | 222/94 |
| 4,564,131 | 1/1986 | Lantry | 222/213 |
| 4,607,762 | 8/1986 | Zulauf et al. | 222/48 |
| 4,795,063 | 1/1989 | Sekiguchi et al. | 222/105 |
| 4,844,299 | 7/1989 | Sekiguchi et al. | 222/95 X |

FOREIGN PATENT DOCUMENTS 2578806  9/1986  France ................................ 222/495

Primary Examiner—Michael S. Huppert
Attorney, Agent, or Firm—Joseph F. Shirtz

[57] ABSTRACT

Apparatus for dispensing predetermined amounts of viscous product. The apparatus has a conduit which is telescopically received with a cap. The cap and conduit define an expandable dosing chamber which expands to a predetermined maximum volume when product is introduced into the chamber through the conduit. A check valve prevents back flow of product through the conduit. Collapsing the chamber from its maximum volume to a minimum volume dispenses the product from the dosing chamber.

7 Claims, 6 Drawing Sheets

DOSING CAP

FIELD OF THE INVENTION

The invention relates to a cap for dosing a predetermined amount of cream or gelatinous product and in particular a cap for dosing amounts from a collapsible tube of product.

BACKGROUND OF THE INVENTION

In packaging of pastes, creams, and topical ointments, a collapsible tube is often used. The packaging permits storage of the product in the absence of air and other possible contaminants. Tubes are made from drawn metal or laminated foils and films depending on the characteristics desired of the tube and the sensitivity of the contents to contamination by external elements.

One drawback of collapsible tubes and the products contained therein is the inability to quickly and accurately measure quantities dispensed from such tubes. Usually, such tubes hold viscous pastes, creams, gels and the like which do not flow easily. Therefore, such substances are difficult to dispense in accurate amounts.

The viscous nature of the substances can cause a user to believe that he or she has a certain quantity of dispensed when the actual amount is far greater or far less. This has leant itself to often describing the amount of product dispensed in terms of the length of a strip of product extruded by squeezing the collapsible tube. However, this method is subject to each individual's perception of length and the substantial errors associated therewith.

U.S. Pat. No. 2,904,227 discloses a metering device for a squeeze-type container. The device uses a piston and metering chamber structure. The piston uncovers the metering chamber when the piston is in a first position. Movement of the piston to an extended position closes off the metering chamber and dispenses fluid through a conduit having end ports. The disclosure explains that the device is limited to low viscosity substances. The device relies on the internal container pressure to move the piston. In use, it is difficult to tell whether the piston has fully extended or to provide sufficient pressure to dispense high viscosity products such as creams and pastes.

U.S. Pat. No. 3,338,475 discloses a device for dispensing liquids or creams. The device operates in the form of a single shot pump. That is, the device has a resilient pump unit with a check valve at each end. The unit is squeezed to force the product out through the check valve at the outlet end. The resiliency of the unit then expands the chamber closing the outlet check valve and pulling product into the chamber through a check valve at the container neck. The resiliency of the unit must be sufficient to pull viscous substances from the container. Thus, the more viscous the substance, the more force that is necessary to overcome the resiliency of the unit. Furthermore, there is no positive indication of when a "dose" has been administered. Rather, the dose size is a function of the size and strength of the user's fingers as well as the depth of the compression of the unit.

U.S. Pat. No. 4,376,495 describes a device for dispensing an adjustable dose from a flexible container. The device has a hollow piston structure which moves within a neck of a container. The piston moves to a position against stops at the end of the neck to prevent further flow of container contents. To reset the dose, a central pin is inserted to push the piston back. A valve in the piston is concurrently opened to permit flow of a portion of the contents from one side of the piston to the other thus allowing piston movement. The initial position that the piston is returned to determines the quantity of contents dispensed at the next usage.

Other U.S. patents disclosing valve or dosing assemblies for dispensing containers are U.S. Pat. Nos. 4,564,131 and 4,607,762.

The above-described devices lack an ease of operation and a reliability necessary for many consumer products. A consumer must be able to easily and quickly determine that an appropriate amount of a substance has been dispensed, but the described devices lack the requisite ease of operation.

SUMMARY OF THE INVENTION

The invention relates to a dosing and dispensing apparatus which supplies a measured dose of a viscous product from a container. The apparatus is sealingly attached to the container by, for example, a threaded or snap connection.

A conduit of the apparatus extends from the container and communicates with the contents of the container. When product is expelled or drawn out of the container, it is directed through the conduit.

At an end of the conduit is an expandable dosing chamber. The dosing chamber receives product which flows from the container through the conduit. The dosing chamber has a predetermined minimum and maximum volume. Advantageously, the dosing chamber may be formed by a slidable cap which is telescopingly received on the conduit. The cap slides between expanded and contracted positions which respectively define the maximum and minimum dosing chamber volumes.

A check valve is associated with the conduit and prevents flow of product through the conduit into the container when the dosing chamber is collapsed.

A discharge opening is defined by the dosing chamber through which product contained in the dosing chamber is discharged when the chamber is collapsed. The flow through this opening is controlled, however, by a back pressure means. The back pressure means prevents flow through the discharge opening when the pressure within the chamber is at or below the pressure necessary to expand the chamber and permits flow at pressures greater than that necessary to expand the chamber. Thus, product being transferred into the chamber will not exit the chamber until the chamber is fully expanded. Any attempt increase in internal pressure merely expands the chamber which in turn prevents the pressure from expelling the product.

BRIEF DESCRIPTION OF THE DRAWINGS

The invention will now be described with reference to the accompanying figures wherein.

DETAILED DESCRIPTION

Figure 1:
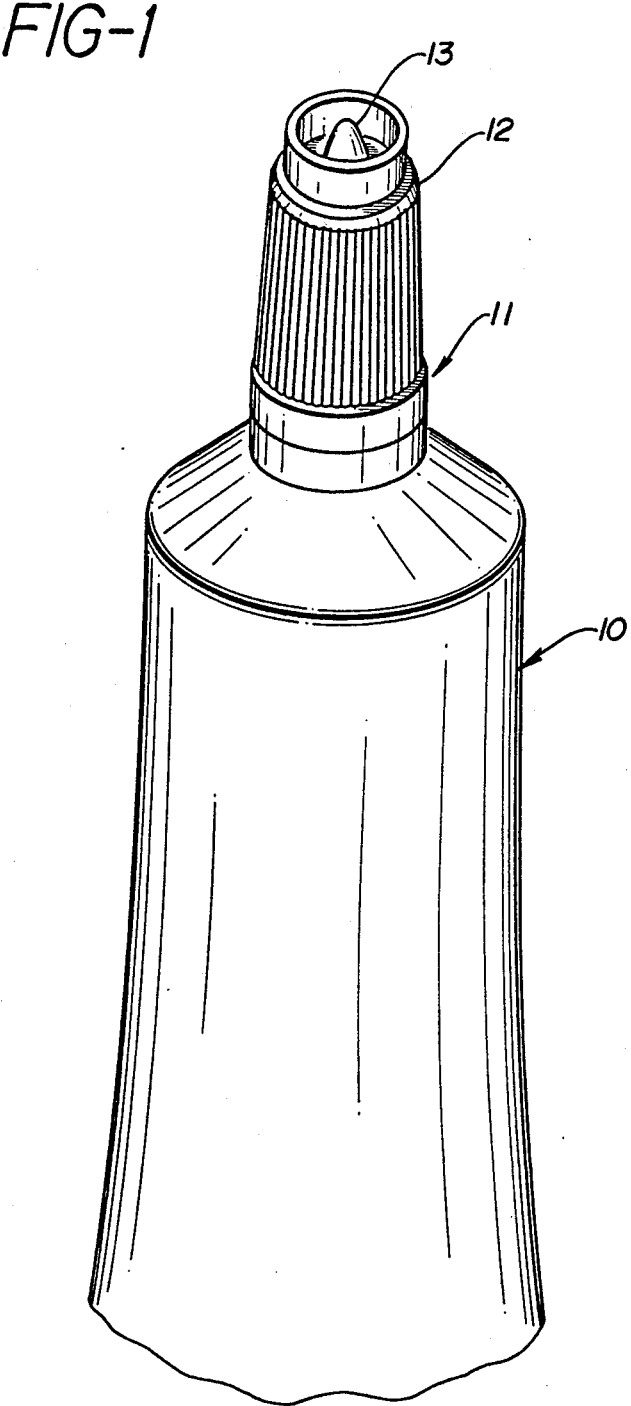
FIG. 1 is a partial perspective view of a collapsible container having the device of the present invention attached thereto.

Referring to FIG. 1, a collapsible tube 10 is shown having dosing device 11 on its open end. Dosing device 11 has a protective overcap 12 which protects the devices mechanism until ready for use and maintains the integrity of the product. The overcap 12 may be provided with a piercing means 13 to pierce a foil of film (not shown) which seals the neck of the tube 10 prior to initial use.

Figure 2:
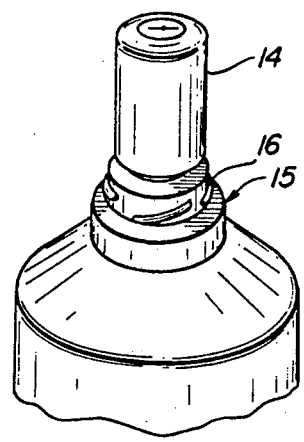
FIG. 2 is a partial perspective view of the dosing apparatus of the present invention in its initial, collapsed position.
Figure 3:
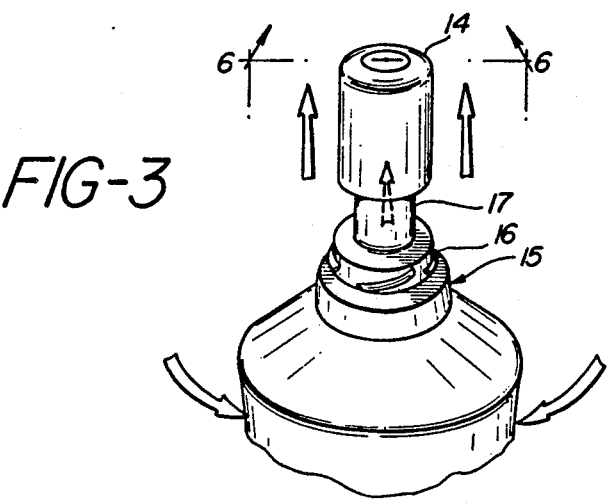
FIG. 3 is a partial perspective view of the dosing apparatus of the present invention in its expanded position.
Figure 4:
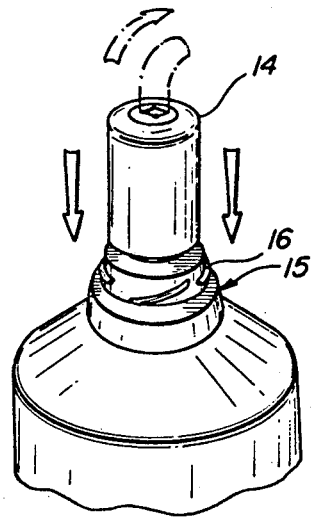
FIG. 4 is a partial perspective view of the dosing apparatus of the present invention discharging a dosed amount of product.

Upon removing the overcap 12, the device 11 is in its initial collapsed position (FIG. 2). That is, cap 14 is contracted down onto the device base 15. Base 15 has external threads 16 which mate with internal threads on overcap 12 to hold the overcap on the device. Thus, the overcap 12 is simply removed by twisting.

Figure 5:
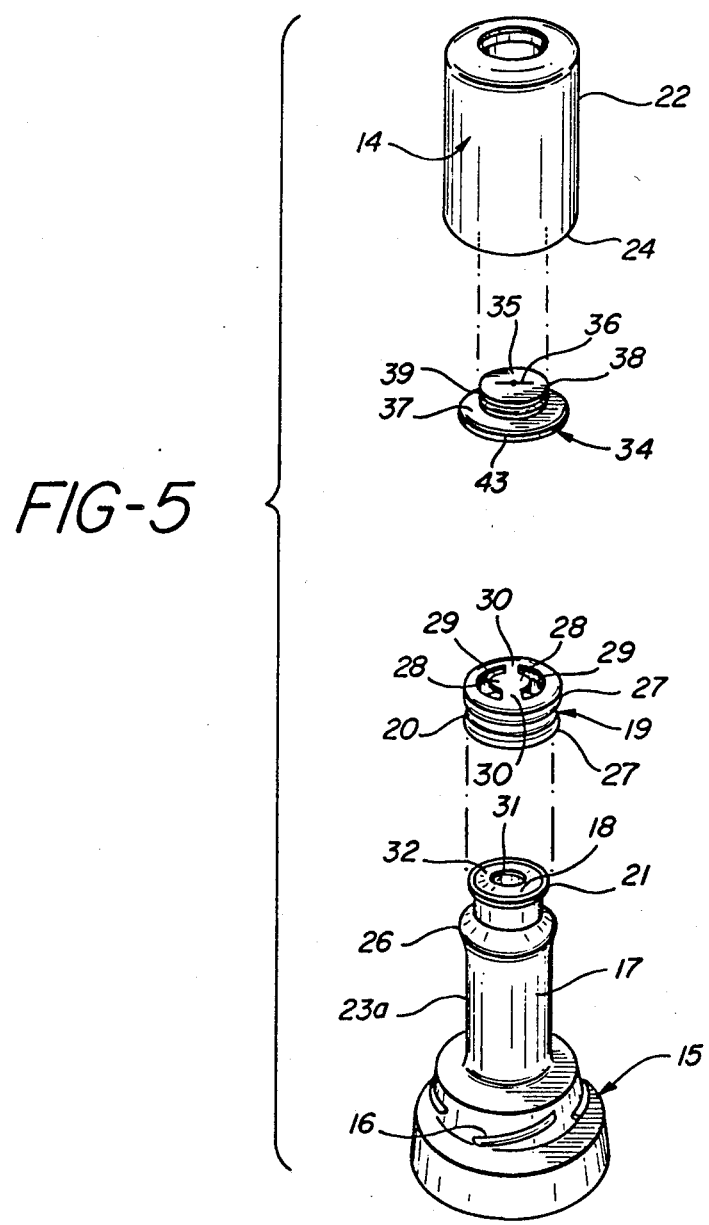
FIG. 5 is an exploded view of the apparatus of the invention.

Base 15 has internal threads 16A to attach the device to the threaded neck of tube 10. Base 15 has a cylindrical conduit 17 (FIG. 5) extending longitudinally. Conduit 17 is open at both ends and communicates with the internal volume of tube 10. Thus, squeezing of the tube 10 will cause product contained within the tube to be forced through the conduit 17 and out of end 18.

End 18 receives thereon flapper valve 19. The valve has a depending cylindrical skirt 20 (FIGS. 5 and 6) which receives end 18, and is made of an elastomeric material such as rubber. The depending skirt 20 has an inner diameter slightly smaller than the diameter of conduit 17 adjacent end 18. At the end 18 of conduit 17, a circumferential lip 21 is formed. The lip may extend around the entire circumference of conduit 17 or only partially about the circumference. Skirt 20 has an enlarged inner diameter adjacent the valve end of the skirt. This enlarged diameter forms a portion for receiving lip 21 of conduit 17 when the valve 19 is received thereon. Because the skirt's inner diameter is slightly smaller than that of the conduit 17 adjacent end 18, the skirt is received on the conduit by elastic stretching of the skirt 20. Once on conduit 17, the valve 19 is held in place by the interaction of lip 21 and the enlarged inner diameter of skirt 20. Additional holding force is provided by the frictional grip of the conduit surface provided by the valve skirt's elastic tendency to return to its original diameter.

Cap 14 is cylindrical in shape and is slidably received on conduit 17 in a telescoping manner. Cap 14 has a depending skirt 22 which has an inner circumferential surface 23. Adjacent open end 24, the surface 23 has a circumferential rib 25. Rib 25 defines an inner diameter approximately equal to the diameter of outer surface 23a of the conduit 17. Conduit 17 has an outwardly extending rib 26 which defines an outer diameter greater than the inner diameter of rib 25. Thus, as the cap 14 is slidably moved relative conduit 17, the ribs 25,26 interfere with one another preventing removal of cap 14 from conduit 17 and establishing a maximum point of movement of cap 14.

Skirt 20 of the flapper valve 19 forms a pair of circumferential protuberances 27. The protuberances 27 act as integrally formed seals in the same manner as conventional O-rings. The protuberances act both statically and dynamically, that is the seal operates when the pressure increases within cap 14 and the cap is held in position or when the cap 14 is moving relative conduit 17. The protuberances have an outer uncompressed diameter at least equal to and preferably greater than the inner diameter defined by surface 23. Thus, when cap 14 is placed over conduit 17, the protuberances 27 are slightly compressed forming a positive surface contact seal.

In the center of valve 19 are a pair of semi-circular shaped flapper arms 28. Arms 28 are formed by two arcuate openings 29 defined in the valve member 19. The arms 28 remain attached to the remainder of the valve 19 by strips 30. The arms 28 form a disc shape having a diameter greater than that of opening 31 in end 18 of conduit 17. Thus, when valve 19 is placed on end 18, the arms 28 overlap the edge 32 of end 18. Edge 32 supports strips 30 and forms a seat for arms 28. When the pressure within the conduit is greater than the pressure on the opposite side of the valve 19, the flapper arms 28 flex resiliently away from edge 32 opening end 18 of conduit 17. When the pressures on opposite sides of the valve equalize the arms 28 return to seat on edge 32, sealing the conduit. When the pressure on the outside of the valve is increased above that within the conduit, the arms 28 are forced against edge 32 forming a tighter seal and preventing flow into the conduit through end 18.

Cap 14 defines an opening 33 at an end opposite end 24. This opening may be sized so that a viscous product would not flow therethrough absent a pressure difference from one side of the opening to the other which is sufficient to move cap 14 along conduit 17 from its fully collapsed position to a fully expanded position. Preferably, the opening receives a means for maintaining a pressure difference between the interior of cap 14 and its exterior such as a slit valve 34.

Slit valve 34 is formed of an elastomeric material such as rubber. The slit valve 34 has a membrane section 35 which substantially blocks opening 33 and sealingly engages cap 14. A membrane section 35 defines an opening such as slit 36. The slit 36 is normally closed, however, when the pressure on the inside of the cap 14 is greater than the pressure on the outside by an amount sufficient to overcome the elastic forces of the membrane section 35 which hold the slit closed, the slit 36 opens permitting a substance to pass therethrough to equalize the pressure. The size of the slit 36 and elastic properties of membrane section 35 define the force necessary to open slit 36. The cap parameters are chosen so the force necessary to open the valve is greater than that necessary to move cap 14 from its contracted position to its expanded position. It is easily seen, therefore, that the force on the valve will not be great enough to open slit 36 until the cap 14 reaches its fully extended position. Until fully extended, any pressure differential between the inside and outside of the cap are equalized by the telescoping motion of the cap.

Slit valve 34 has a flange 37 spaced from and diverging from the plane of membrane section 36. Cylindrical trunk 38 spaces the flange 37 from membrane section 36 and defines a groove 39. Groove 39 receives and holds first positioning rib 40 which extends around and radially into opening 33. A second positioning rib 41 extends around and radially into the inside of cap 14. Second positioning rib 41 is spaced from the inside top surface 42 of cap 14. The space defined between second positioning rib 41 and top surface 42 receives the outer circumferential edge 43 of flange 37. Thus, when slit valve 34 is flexed into position within cap 14, it is held in position by first and second positioning ribs 40,41. The slit valve 34 is held in position with flange 37 in face to face surface contact with top surface 42. Thus, the surface contact forms a seal which increases in sealing force when the pressure within cap 14 increases and forces flange 37 against top surface 42. It should be noted that although the valve 34 has been described with a slit opening, many different openings, such as a pin hole for example, will work. The opening configuration and size is determined by the elasticity of valve 34 and the viscosity of the product to be dispensed. Even a rigid opening having no valve 34 may be used to dispense very viscous substances which will not flow easily through a small opening except through a pressure differential which exceeds that necessary to telescope cap 14.

Figure 6:
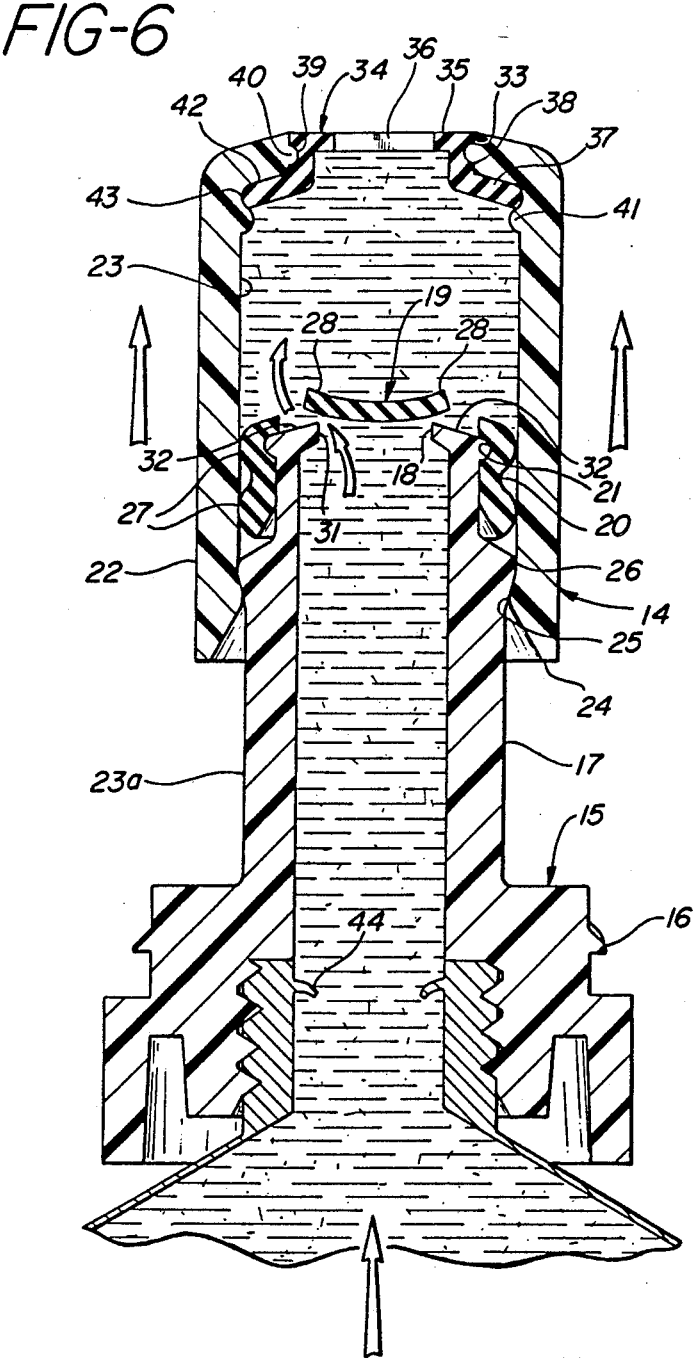
FIG. 6 is a longitudinal cross-section of the apparatus of the invention.
Figure 7:
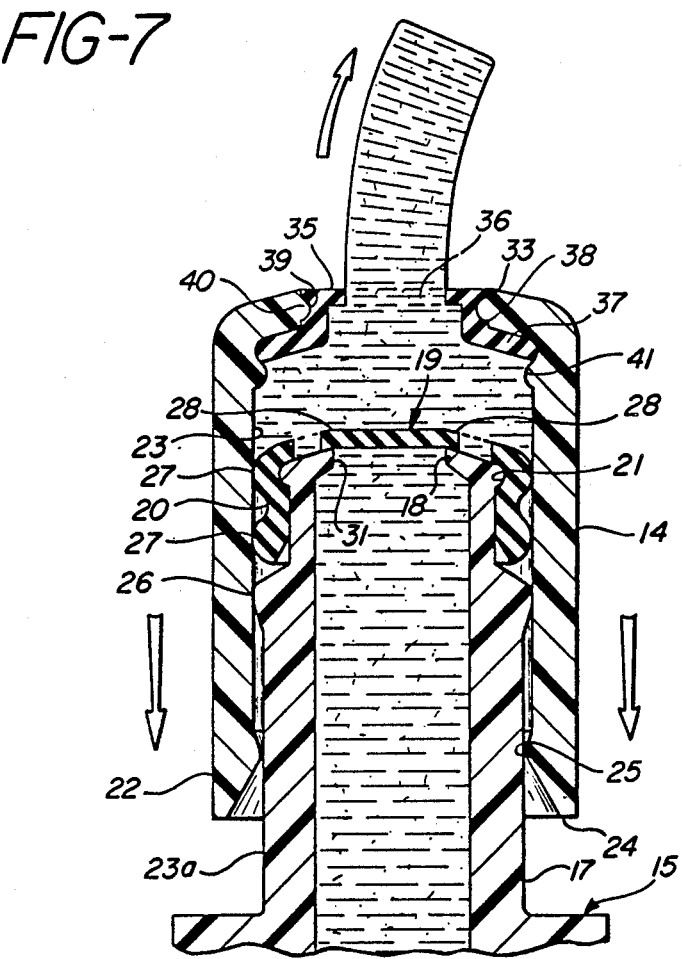
FIG. 7 is a longitudinal cross-section of the apparatus showing discharge of a dosed amount of product from the apparatus.

The operation of the device will now be described with reference to the sequence in FIGS. 1, 6 and 7. Initially, the tube 10 is sealed by an occlusion seal of its neck and the dosing device is separated from the tube neck. Piercing means 13 is thrust into the neck to pierce the seal leaving a marginal remainder 44. The dosing device 11 is then threadedly attached to the neck of tube 10. Initially, cap 14 is fully contracted upon conduit 17 (FIG. 2). Upon squeezing the tube 10, the viscous product contained within the tube is forced up through the neck of the tube and then through conduit 17 (FIG. 6). When the product reaches the underside of flapper valve 19, further squeezing of the tube forces arms 28 away from edge 32 permitting passage of the product from the conduit 17 into the volume defined between the cap 14 and the valve 19.

As the pressure increases within the dosing chamber, that is the space defined between the cap 14 and valve 19, the cap 14 telescopes upward along conduit 17. The increase in volume caused by the telescoping cap is filled with product from the tube.

Once the cap 14 telescopes to a point where rib 25 meets rib 26, the ribs 25,26 interfere with one another to prevent further movement of cap 14. Continued squeezing of tube 10 will cause a small amount of product to escape through slit valve 34, signaling the user that a full dose is ready to be dispensed.

In order to dispense the product from the dosing chamber, cap 14 is pushed down onto conduit 17. Flapper valve 19 closes in response to the pressure increase within the dosing chamber caused by the decreasing volume. Slit valve 34 is forced open by the pressure and the product is extruded through slit 36. A full dose is dispensed when cap 14 is fully contracted onto conduit 17 thus decreasing the dosing chamber volume to its minimum volume.

The size of the dose dispensed is the difference between the maximum volume of the dosing chamber (i.e. when cap 14 is extended to the point where the ribs 25,26 meet) and its minimum volume. By changing the dimensional parameters of the cap and conduit, an appropriate dose volume may be provided for the particular product, in particular volumes in excess of 0.05 cc may be readily dispensed. After dispensing, the overcap is returned to the apparatus to cover and protect the apparatus.

Figure 8:
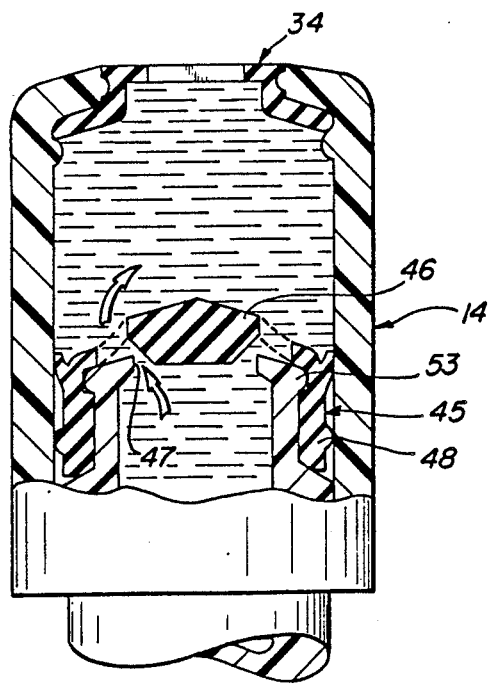
FIG. 8 is a longitudinal cross-sectional view of the apparatus showing an alternative embodiment.
Figure 9:
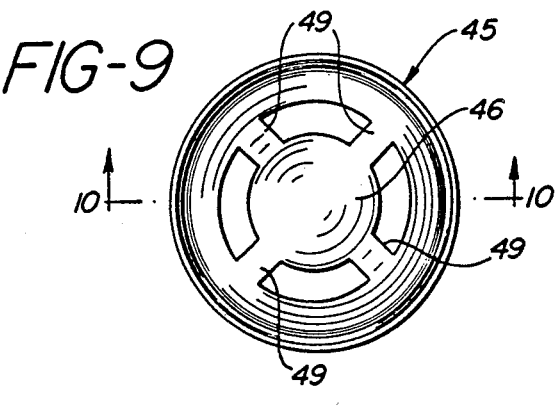
FIG. 9 is a top plan view of the check valve of FIG. 8.
Figure 10:
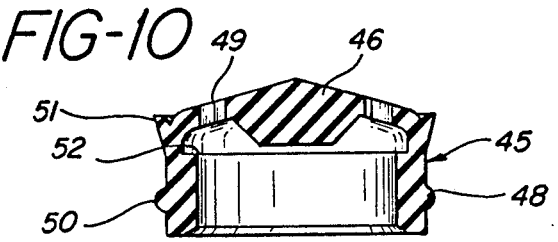
FIG. 10 is a cross-sectional view of FIG. 9 along line 10—10.

An alternative embodiment is depicted in FIGS. 8-10. In particular the flapper valve has been replaced by a stopper valve 45. Stopper valve 45 has a central stopper 46 which plugs opening 47 of conduit 17. The stopper 46 is attached to a depending skirt 48 by connecting strips 49. The valve 45 may be fabricated by, for example, molding elastomeric material. The material must have sufficient elasticity to permit strips 49 to flex as stopper 46 moves out of opening 47 in response to a pressure differential across the stopper.

Skirt 48 has a circumferential protuberance 50 and circumferential wing 51. Wing 51 is shaped in an upwardly extending configuration. Thus protuberance 50 acts as an O-ring as described in connection with protuberance 27. Wing 51, however, is pressed against the wall of cap 14 as the cup slides downward on conduit 17 by its shape and by the frictional forces between the cap and wing. Also the increased pressure within the chamber during dispensing forces wing 51 outward. Thus the movement of the cap and pressure of the product during dispensing increase the force pressing wing 51 against the cap surface. As in the flapper valve, the stopper valve is provided with a circumferential groove 52. Groove 52 receives lip 53 when the skirt is placed over the conduit. The valve 45 is held in position by the frictional forces between the skirt and conduit, and by the engagement of lip 53 and groove 52.

What is claimed is:

1. A dosing and dispensing apparatus for supplying a measured dose of a viscous product from a container through an opening in the container comprising:
 (a) means for sealingly attaching the apparatus to said container in communication with said opening;
 (b) a conduit for communicating with said opening and for directing product out of said container into a dosing chamber;
 (c) an expandable dosing chamber communicating with said conduit, having a predetermined minimum volume in a contracted position and a predetermined maximum value in an expanded position, said dosing chamber partially defined by a cap member which surrounds and slidably engages said conduit so as to be telescopingly received on said conduit;
 (d) stops for restricting the sliding movement of said cap beyond an extended position where said cap and conduit define the expanded position of said dosing chamber;
 (e) a check valve associated with said conduit and seated on a first end of said conduit to permit flow of product through said conduit into said dosing chamber and preventing flow out of said dosing chamber through said conduit said check valve including a depending skirt surrounding the outer surface of said first end of said conduit and sandwiched between said outer surface and said cap member to provide a seal therebetween;
 (f) a discharge opening defined by said dosing chamber through which product is discharged from said dosing chamber when said dosing chamber contains product and is collapsed from its expanded position to its contracted position; and
 (g) a back pressure means for controlling the flow of product out of said discharge opening by permitting flow of product out of said discharge opening when the pressure within the chamber is greater than that necessary to expand the chamber from its contracted position and substantially preventing flow when the pressure is no greater than that needed to expand the chamber from its contracted position.

2. The apparatus according to claim 1 wherein said check valve is a unitary piece of elastomeric material.

3. The apparatus according to claim 2 further including:
   (a) at least one circumferential protuberance extending radially outward from said skirt.

4. The apparatus according to claim 3 wherein:
   (a) said at least one protuberance extends at an angle to said skirt.

5. The apparatus according to claim 1 wherein:
   (a) said discharge opening comprises an elastomeric membrane defining an opening and said membrane has an elasticity sufficient to hold said opening substantially closed when the pressure difference from one side of the membrane to the other is at least sufficient to expand said dosing chamber from its retracted position to its expanded position.

6. A dosing and dispensing apparatus for supplying a measured dose of a viscous product from a container through an opening in the container comprising:
   (a) means for sealingly attaching the apparatus to said container in communication with said opening;
   (b) a conduit communicating for with said opening and for directing product out of said container into a dosing chamber;
   (c) an expandable dosing chamber communicating with said conduit, having a predetermined minimum volume in a contracted position and a predetermined maximum value in an expanded position, said dosing chamber partially defined by a cap member which surrounds and slidably engages said conduit so as to be telescopingly received on said conduit;
   (d) stops for restricting the sliding movement of said cap beyond an extended position where said cap and conduit define the expanded position of the dosing chamber;
   (e) a check valve associated with said conduit and seated on a first end of said conduit to permit flow of product through said conduit into said dosing chamber and preventing flow out of said dosing chamber through said conduit and including a displaceable stopper means which moves axially of said conduit between a first position blocking flow through said conduit and a second position permitting flow through said conduit, said stopper means being resiliently biased into said first position, said check valve including a circumferentially depending skirt which is received on said conduit;
   (f) a discharge opening defined by said dosing chamber through which product is discharged form said dosing chamber when said dosing chamber contains product and is collapsed from its expanded position to its contracted position; and
   (g) a back pressure means for controlling the flow of product out of said discharge opening by permitting flow of product out of said discharge opening when the pressure within the chamber is greater than that necessary to expand the chamber from its contracted position and substantially preventing flow when the pressure is no greater than that needed to expand the chamber from its contracted position.

7. The apparatus according to claim 6 wherein:
   (a) resilient strips attach said stopper means to said skirt and resiliently bias said stopper means into said second position.

* * * * *